(12) United States Patent
Aryanfar

(10) Patent No.: US 9,620,808 B2
(45) Date of Patent: Apr. 11, 2017

(54) METHOD AND DEVICE FOR DENDRITE RESEARCH AND DISCOVERY IN BATTERIES

(71) Applicant: Asghar Aryanfar, Pasadena, CA (US)

(72) Inventor: Asghar Aryanfar, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 434 days.

(21) Appl. No.: 14/201,979

(22) Filed: Mar. 10, 2014

(65) Prior Publication Data

US 2014/0255763 A1 Sep. 11, 2014

Related U.S. Application Data

(60) Provisional application No. 61/776,454, filed on Mar. 11, 2013.

(51) Int. Cl.
*H01M 10/04* (2006.01)
*H01M 2/02* (2006.01)
*H01M 10/0585* (2010.01)
*H01M 10/42* (2006.01)

(52) U.S. Cl.
CPC ....... *H01M 10/0427* (2013.01); *H01M 2/022* (2013.01); *H01M 10/0585* (2013.01); *H01M 10/4285* (2013.01)

(58) Field of Classification Search
CPC ............ H01M 10/0427; H01M 2/022; H01M 10/0585; H01M 10/4285
See application file for complete search history.

(56) References Cited

U.S. PATENT DOCUMENTS

| | | | |
|---|---|---|---|
| 6,749,648 B1 * | 6/2004 | Kumar | B82Y 30/00 29/623.1 |
| 2004/0146780 A1 * | 7/2004 | Rubino | H01M 2/023 429/164 |
| 2009/0197171 A1 * | 8/2009 | Nakazato | H01G 9/016 429/209 |
| 2014/0093052 A1 * | 4/2014 | Chupas | G01N 23/20025 378/208 |

* cited by examiner

*Primary Examiner* — Barbara Gilliam
*Assistant Examiner* — Nathanael Zemui
(74) *Attorney, Agent, or Firm* — Gavrilovich, Dodd & Lindsey LLP; Joseph R. Baker, Jr.

(57) ABSTRACT

An electrolytic coin cell that has been used to study the growth of lithium dendrites by optical observation is described. The cell makes possible observation of the growth of the dendrites in response to various applied conditions, such as applied electrical signals, chemical effects, and temporal effects in a real coin cell geometry.

9 Claims, 6 Drawing Sheets

FIG. 1A
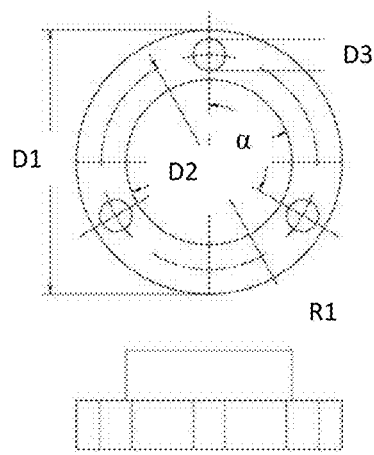
FIG. 1B
FIG. 1C
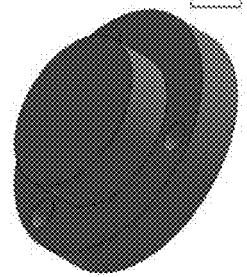
FIG. 1D
FIG. 2A
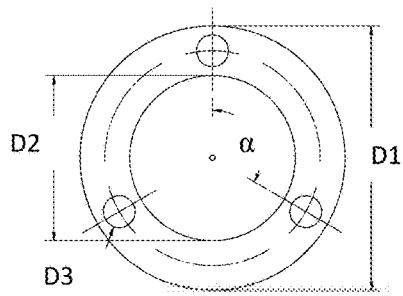
FIG. 2B
FIG. 2C
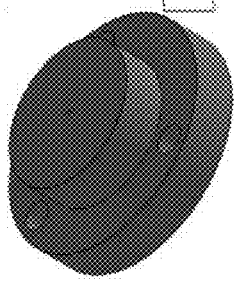
FIG. 2D FIG. 3A   FIG. 3B
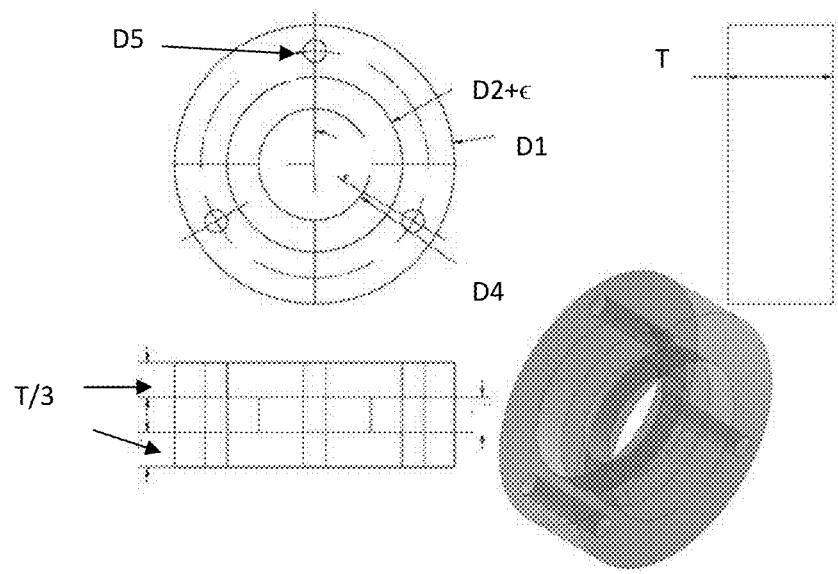
FIG. 3C   FIG. 3D
FIG. 4A
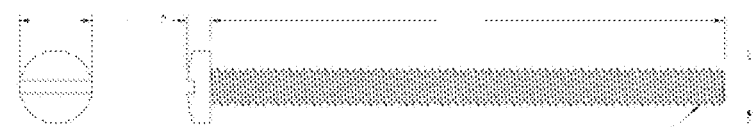
FIG. 4B   FIG. 4C FIG. 5A
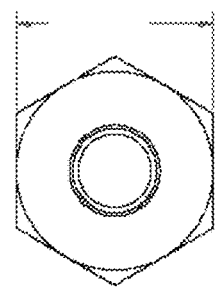
FIG. 5B　　　　　　　FIG. 5C
FIG. 6A　　　　　　　FIG. 6B
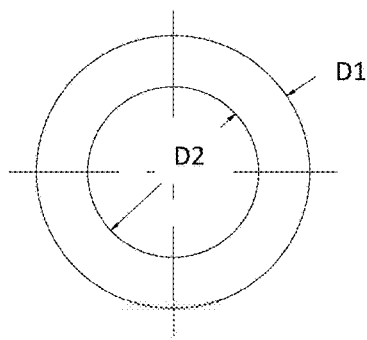
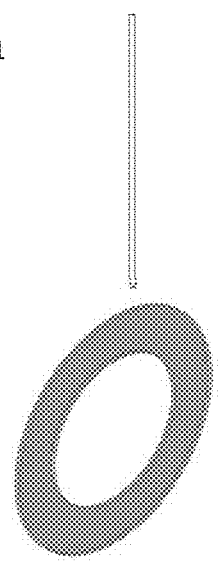
FIG. 6C　　　　　　　FIG. 6D

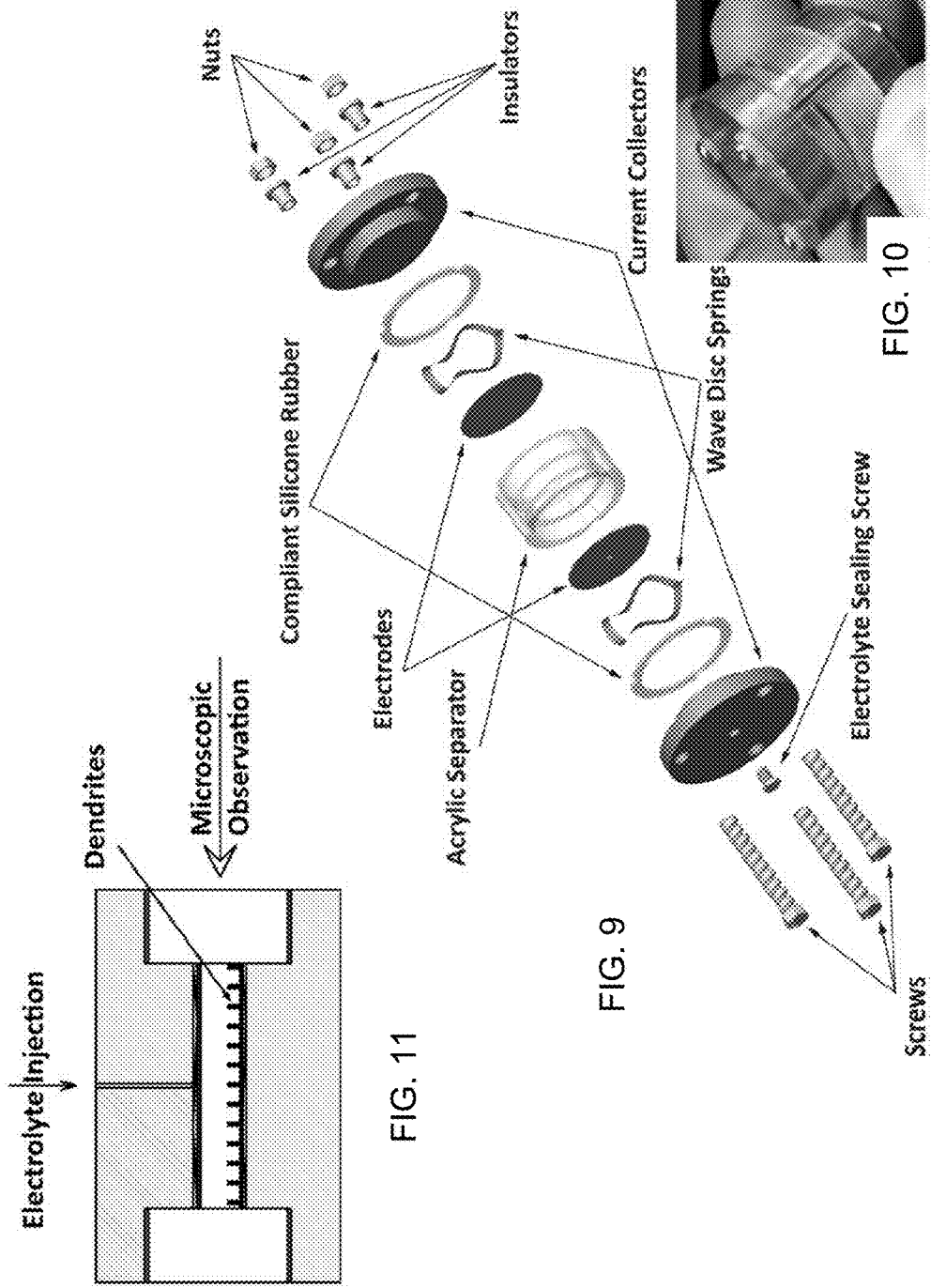

METHOD AND DEVICE FOR DENDRITE RESEARCH AND DISCOVERY IN BATTERIES

CROSS-REFERENCE TO RELATED APPLICATIONS

This application claims priority to and the benefit of co-pending U.S. provisional patent application Ser. No. 61/776,454, filed Mar. 11, 2013, which application is incorporated herein by reference in its entirety.

FIELD OF THE INVENTION

The invention relates to apparatus used in research in general and particularly to apparatus that allows in situ experimental visualization.

BACKGROUND OF THE INVENTION

Rechargeable batteries are known to fail unexpectedly via short-circuiting through metallic dendrites that grow between electrodes upon recharging. This phenomenon triggers a series of events that begin with overheating, eventually followed by the thermal decomposition and ultimately the ignition of the organic solvents used in such devices. This flaw has become a major safety issue in the operation of the recently introduced larger passenger aircraft.

Many efforts have focused on exploring the effects of chemical composition and morphology of various electrode materials (see J. M Tarascon, M. A., *Issues and challenges facing rechargeable lithium batteries*. Nature, 2001 414: p. 359-367; Armand, M. and J. M. Tarascon, *Building better batteries*. Nature, 2008. 451 (7179): p. 652-657) and the nature of solvents and electrolytes (see Xu, K., *Nonaqueous liquid electrolytes for lithium-based rechargeable batteries*. Chem Rev, 2004. 104 (10): p. 4303-417) on the energy density and lifetime of batteries. However, ultimate battery performance is still limited by capacity decay and failure due to short-circuiting via dendrite formation. Lithium is used in lithium battery electrodes, whose energy density (3862 mAh/g) is more than 10 times larger than graphite (372 mAh/g). On the other hand, lithium is more prone to grow dendrites relative to graphite, since lithium deposition is dominant over lithium intercalation (see Daniel, C., *Materials and Processing for Lithium-Ion Batteries*. JOM, 2008. 60).

Researchers have tried to prevent the growth of dendritic microstructures using various techniques, which are still unsuccessful. On the experimental side, several studies have tracked the influence of control parameters such as current density (see F. Orsini, A.D.P., B. Beaudoin, J. M. Tarascon, M. Trentin, N. Langenhuisen, E. D. Beer, P. Notten, *In Situ Scanning Electron Microscopy (SEM) observation of interfaces with plastic lithium batteries*. Journal of power sources, 1998. 76: p. 19-29; Graciela Gonzalez, M. R., and Elisabeth Chassaing, *Transition between two dendritic growth mechanisms in electrodeposition*. Physical Review E, 2008. 78 (011601)), geometry (see Monroe, C. and J. Newman, *The effect of interfacial deformation on electrodeposition kinetics*. Journal of the Electrochemical Society, 2004. 151 (6): p. A880-A886; Liu, X. H., et al., *Lithium fiber growth on the anode in a nanowire lithium ion battery during charging*. Applied Physics Letters, 2011. 98 (18)), solvent and electrolyte chemical composition (see Crowther, O. and A. C. West, *Effect of electrolyte composition on lithium dendrite growth*. Journal of the Electrochemical Society, 2008. 155 (11): p. A806-A811; Howlett, P. C., D. R. MacFarlane, and A. F. Hollenkamp, *A sealed optical cell for the study of lithium-electrode electrolyte interfaces*. Journal of Power Sources, 2003. 114 (2): p. 277-284; Schweikert, N., et al., *Suppressed lithium dendrite growth in lithium batteries using ionic liquid electrolytes: Investigation by electrochemical impedance spectroscopy, scanning electron microscopy, and in situ $^7Li$ nuclear magnetic resonance spectroscopy*. Journal of Power Sources, 2013. 228 (0): p. 237-243) and electrolyte concentration (see Brissot, C., et al., *In situ concentration cartography in the neighborhood of dendrites growing in lithium/polymer-electrolyte/lithium cells*. Journal of the Electrochemical Society, 1999. 146 (12): p. 4393-4400; Brissot, C., et al., *Concentration measurements in lithium/polymer-electrolyte/lithium cells during cycling*. Journal of Power Sources, 2001. 94 (2): p. 212-218) on dendrite formation.

Methods that have been developed to slow down dendrite formation include the use of powdered electrodes (see Kim, W. S. and W. Y. Yoon, *Observation of dendritic growth on Li powder anode using optical cell*. Electrochimica Acta, 2004. 50 (2-3): p. 541-545), the application of successive bipolar charge pulses (see Chen, L. L., Xue Li Zhao, Qiang Cai, Wen Bin Jiang, Zhi Yu *Bipolar Pulse current method for inhibiting the formation and lithium dendrites*. Acta Phys. Chim. Sin, 2006. 22 (9): p. 1155-1158), and covering lithium electrodes with adhesive lamellar block copolymers (see Stone, G. M., et al., *Resolution of the Modulus versus Adhesion Dilemma in Solid Polymer Electrolytes for Rechargeable Lithium Metal Batteries*. Journal of the Electrochemical Society, 2012. 159 (3): p. A222-A227).

The dynamics of dendrite growth also has been characterized to some extent. Studies gave considered evolution time (see Rosso, M., et al., *Onset of dendritic growth in lithium/polymer cells*. Journal of Power Sources, 2001. 97-8: p. 804-806), growth rate (see Brissot, C., et al., *In situ study of dendritic growth in lithium/PEO-salt/lithium cells*. Electrochimica Acta, 1998. 43 (10-11): p. 1569-1574) and electrolyte convection see Fleury, V., J. N. Chazalviel, and M. Rosso, *Theory and Experimental-Evidence of Electroconvection around Electrochemical Deposits*. Physical Review Letters, 1992. 68 (16): p. 2492-2495).

On the theoretical side, the few idealistic schemes have been developed to account for lithium dendrite growth have multiple deficiencies, such as dendrite shape and one dimensional cell geometry (see Chazalviel, J. N., *Electrochemical Aspects of the Generation of Ramified Metallic Electrodeposits*. Physical Review A, 1990. 42 (12): p. 7355-7367; Monroe, C. and J. Newman, *Dendrite growth in lithium/polymer systems—A propagation model for liquid electrolytes under galvanostatic conditions*. Journal of the Electrochemical Society, 2003. 150 (10): p. A1377-A1384). This has been confirmed by experimental studies on electrochemical deposition of zinc and copper (see Sagues, F., M. Q. Lopez-Salvans, and J. Claret, *Growth and forms in quasi-two-dimensional electrocrystallization*. Physics Reports-Review Section of Physics Letters, 2000. 337 (1-2): p. 97-115). Nonetheless, the dendrite morphology evolution mechanism is not yet understood. The microstructure study is experimentally hard and the SEM imaging of dendrites is not usually practical since the dendrites are very fragile and disassembling the cell and exposure of lithium metal to open atmosphere will not provide accurate results, for example because lithium reacts with oxygen and water vapor in the atmosphere.

Other experimental approaches for observing dendrites have been unsuccessful as well (see Brissot, C., et al.,

*Dendritic growth mechanisms in lithium/polymer cells.* Journal of Power Sources, 1999. 81: p. 925-929).

There is a need for systems and methods that allow more accurate observation of dendrite formation dynamics in more realistic device similar to current batteries.

SUMMARY OF THE INVENTION

According to one aspect, the invention features a coin cell. The coin cell comprises a pair of current collectors, one of the pair of current collectors having defined therein a sealable aperture, each current collector having a flat face, each current collector having an electrical contact accessible on an exterior surface of the coin cell; a non-conductive separator having a transparent region, the non-conductive separator having a central cavity defined therein so as to space the respective flat faces of the pair of current collectors apart by a predefined distance; a plurality of gaskets, each gasket forming an hermetic seal between the non-conductive separator and one of the pair of current collectors when assembled; a seal for the additional sealable aperture of one of the pair of current collectors; and a plurality of non-conductive clamps that hold the pair of current collectors, the non-conductive separator and the plurality of gaskets in registry when assembled.

In one embodiment, each of the pair of current collectors having a plurality of apertures defined therein, the plurality of apertures of one of the pair of current collectors defined so as to be in registry with the plurality of apertures of the other of the pair of current collectors when assembled, and the non-conductive separator having a plurality of apertures defined therein so as to be in registry with the plurality of apertures of each of the pair of current collectors when assembled.

In another embodiment, the plurality of non-conductive clamps are nuts and screws.

In yet another embodiment, the screws are fabricated from a non-conductive material.

In still another embodiment, the screws are fabricated from a conductive material and screw insulators fabricated from a non-conductive material are provided to electrically separate the screws from at least one of the pair of current collectors.

In a further embodiment, the coin cell further comprises a foil made of an electrically conductive material that is compatible with an electrolyte that is to be inserted into the coin cell, the foil positioned in electrical contact with and covering the flat face of one of the pair of current collectors.

In yet a further embodiment, the coin cell further comprises a pressure washer that makes electrical contact between the foil and the one of the pair of current collectors.

In another embodiment, the electrically conductive material and the electrolyte comprise a metal.

In yet another embodiment, the metal is lithium.

In an additional embodiment, the coin cell has cylindrical symmetry.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A is a plan view of an anode current collector for use in the coin cell.

FIG. 1B is a cross section view from one side of the anode current collector.

FIG. 1C is a cross section view of the anode current collector from a direction 90 degrees away from the view of FIG. 1B.

FIG. 1D is a perspective view of the anode current collector.

FIG. 2A is a plan view of a cathode current collector for use in the coin cell.

FIG. 2B is a cross section view from one side of the cathode current collector.

FIG. 2C is a cross section view of the cathode current collector from a direction 90 degrees away from the view of FIG. 2B.

FIG. 2D is a perspective view of the cathode current collector.

FIG. 3A is a plan view of a transparent separator for use in the coin cell.

FIG. 3B is a cross section view from one side of the transparent separator.

FIG. 3C is a cross section view of the transparent separator from a direction 90 degrees away from the view of FIG. 3B.

FIG. 3D is a perspective view of the transparent separator.

FIG. 4A is a perspective view of a screw used to hold the coin cell together when assembled.

FIG. 4B is an end view of a screw used to hold the coin cell together when assembled.

FIG. 4C is a side view of a screw used to hold the coin cell together when assembled.

FIG. 5A is a perspective view of a nut used to hold the coin cell together when assembled.

FIG. 5B is an end view of a nut used to hold the coin cell together when assembled.

FIG. 5C is a side view of a nut used to hold the coin cell together when assembled.

FIG. 6A is a plan view of a gasket for use in the coin cell.

FIG. 6B is a cross section view from one side of the gasket.

FIG. 6C is a cross section view of the gasket from a direction 90 degrees away from the view of FIG. 6B.

FIG. 6D is a perspective view of the gasket used to hermetically seal the cell.

FIG. 9 is an exploded view of one embodiment of a coin cell according to principles of the invention.

FIG. 10 is an image of an assembled coin cell held in a hand to show relative scale.

FIG. 11 is a schematic diagram of a system in which experiments have been performed using the electrolytic coin cell according to principles of the invention.

DETAILED DESCRIPTION

Figure 7:
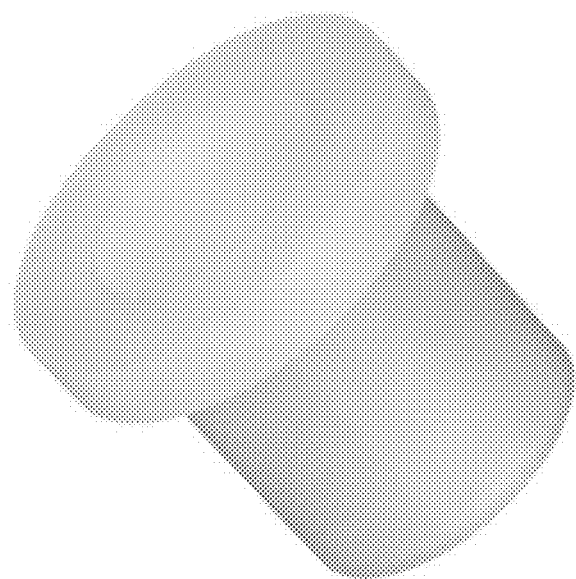
FIG. 7 is a perspective view of a screw insulator used to electrically insulate the screws that hold the coin cell together from at least one of the anode current collector and the cathode current collector.

More direct techniques for monitoring dendrite formation with better time and spatial resolution seem essential to advance our understanding of the phenomenon of dendrite growth (see Bhattacharyya, R., et al., *In situ NMR observation of the formation of metallic lithium microstructures in lithium batteries*. Nature Materials, 2010. 9 (6): p. 504-510).

We now describe a coin cell that provides direct visual observation of dendrite growth and morphology in situ and offers more accurate information for understanding the behavior of lithium batteries.

The coin cell is constructed of components that are separable. In operation, the coin cell can be sealed to prevent reaction with undesired chemical species, such as water vapor and oxygen in room air. The components of the coin cell are as follows:

Current collectors are made of brass, copper or any convenient conductive metal. They can be placed in electrical communication with electrodes to transfer current. FIG. 1D is a perspective view of a first current collector, which is circular with indentation and holes. FIG. 2D is a perspective view of a second current collector, which has the same construction as the first current collector with the exception that there is a threaded aperture defined in it (for example, a 1/71 treaded hole located in the middle of it) to provide a path for electrolyte injection into the coin cell.

FIG. 3D is a perspective view of a transparent separator is provided which determines the inter-electrode distance. The transparent separator can be made of acrylic (which is easy to machine), or in alternative embodiments, from any transparent non-reactive material that is convenient. The transparent separator needs to be transparent at a location where one will observe the events that occur within the volume of the coin cell that contains an electrolyte, but otherwise could equally well be opaque elsewhere. The separator should be an insulator, rather than conductive.

FIG. 4A is a perspective view of a screw used to hold the coin cell together when assembled. In one embodiment, the screws are made of 1-71 stainless steel and are 1" long. However, it will be understood that the screws can be made of any convenient material that is strong enough to hold the assembled cell together when operating, can be any convenient length that is sufficient to hold the assembled cell together, and can have any convenient thread. It will further be understood that if the screws are made of a non-conductive material such as nylon, the screw insulators will be redundant and may be omitted.

FIG. 5A is a perspective view of a nut used to hold the coin cell together when assembled. In one embodiment, the nuts are 1/71 nuts made of stainless steel. However, it will be understood that the nuts can be made of any convenient material that is strong enough to hold the assembled cell together when operating, and can have any thread that will mate with the screws used to hold the assembled cell together.

FIG. 6D is a perspective view of a gasket used to hermetically seal the cell. In one embodiment, the gasket is made of compliant silicone rubber. In other embodiments, other compliant materials that can be used as gaskets may be employed.

FIG. 7 is a perspective view of a screw insulator used to electrically insulate the screws that hold the coin cell together from at least one of the anode current collector and the cathode current collector.

In alternative embodiments, the assembled coin cell can be held together by clamps, such as "C" clamps applied to the opposite external (free) surfaces of the current collectors, and the apertures that provide space for the screws to pass through the various layers of components, the screws themselves, the nuts, and the screw insulators all can be omitted.

Table 1 lists the dimensions used in one embodiment of the coin cell, which dimensions are indicated in the various drawings. The angle α is 120 degrees in a preferred embodiment, but any convenient angle and any convenient number N greater than or equal to two of screws and corresponding nuts can be used.

TABLE 1

| Dimension | Size (inches) |
|---|---|
| D1 | 1.00 |
| D2 | 0.625 |
| D3 | 0.12 |
| R1 | 0.40625 |
| T1 | 0.1875 |
| T2 | 0.1875 |
| D4 | 0.4 |
| D5 | 0.08 |
| D2 + ∈ | 0.627 |
| T | 0.375 |

Figure 8:
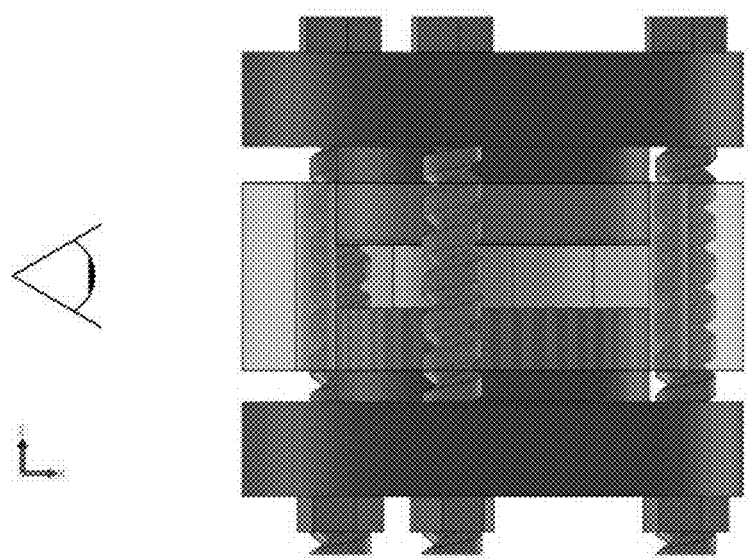
FIG. 8 is a schematic diagram showing a coin cell in partially assembled configuration and an eye of a viewer looking across the coin cell from one side.

FIG. 8 is a schematic diagram showing a coin cell in partially assembled configuration and an eye of a viewer looking across the coin cell from one side.

FIG. 9 is an exploded view of one embodiment of a coin cell according to principles of the invention. In FIG. 9 two structures indicated as "electrodes" (one of which has an aperture that is aligned with the filling hole in the electrode shown in FIG. 2D) and two structures indicated as "wave disk springs" are illustrated. The electrodes can be thin sheets of a metal (in one embodiment lithium metal) that is compatible with the dendrites that are intended to be studied. The "wave disk springs" are pressure washers analogous to lock washers, Belleville washers (cupped spring washers or conical washers) or spring washers and are provided to make a positive electrical contact between the respective electrode and the corresponding current collector, so that electrical continuity can be assured between the two parts. In some embodiments, the pressure washers cam be omitted if the pressure applied by the clamps is sufficient to assure electrical contact between the foil and the current collector.

As illustrated in FIG. 9, the coin cell comprises two Li$^0$ foil disc electrodes (1.59 cm diameter) separated 0.32 cm by a transparent acrylic ring. The cell was filled with 1 M LiClO$_4$ in propylene carbonate (PC) as electrolyte. All operations were conducted in an argon-filled (H$_2$O, O$_2$<0.5 ppm) glovebox. Arrays of multiple such cells were simultaneously electrolyzed under galvanostatic conditions with 2 mA cm$^{-2}$ pulses generated by a programmable multichannel charger. After 48 mAh (173 Coulombs) have circulated through the cells, the lengths of 45 dendrites around the cell perimeter were measured through the acrylic separator using a Leica M205FA optical microscope.

FIG. 10 is an image of an assembled coil cell held in a hand to show relative scale.

FIG. 11 is a schematic diagram of a system in which experiments have been performed using the electrolytic coin cell according to principles of the invention.

We have performed experiments in the electrolytic coin cell that provides for in situ observation of the dendrites grown on the perimeter of the disc electrodes at any stage using a microscope as illustrated schematically in FIG. 11.

Figure 12:
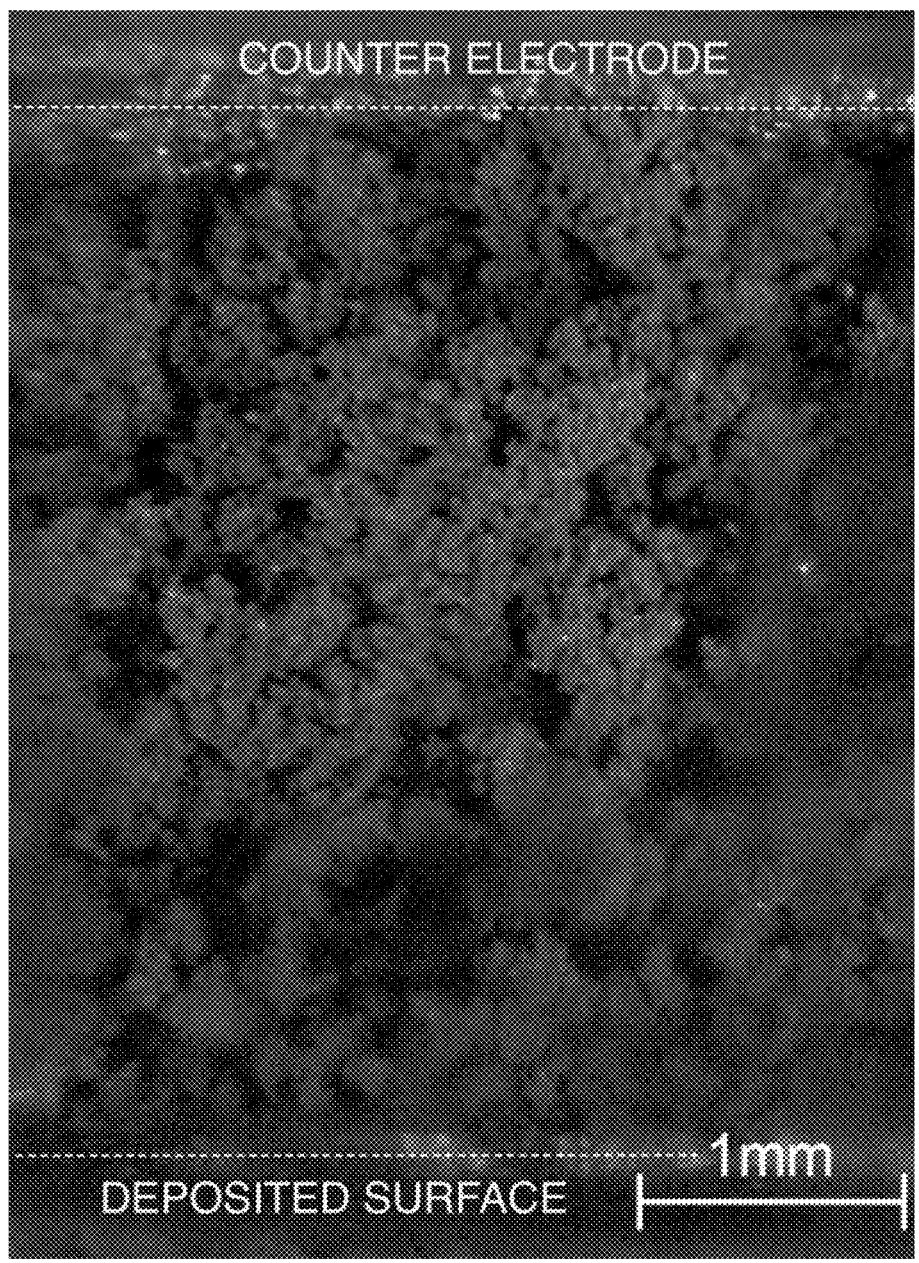
FIG. 12 is an image of dendrites observed in situ using a cell that operates according to principles of the invention.

FIG. 12 is an image of dendrites observed in situ using a cell that operates according to principles of the invention.

The cell has capability for complete sealing for several months and is also detachable from an electrical source for further studies of dendrites.

Definitions

Unless otherwise explicitly recited herein, any reference to an electronic signal or an electromagnetic signal (or their equivalents) is to be understood as referring to a non-transitory electronic signal or a non-transitory electromagnetic signal.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A coin cell, comprising:
a pair of current collectors, one of the pair of current collectors having defined therein a sealable aperture, each current collector having a flat face, each current collector having an electrical contact accessible on an exterior surface of said coin cell, wherein each of said pair of current collectors has a plurality of apertures defined therein, said plurality of apertures of one of said pair of current collectors defined so as to be in alignment with said plurality of apertures of the other of said pair of current collectors when assembled;
a non-conductive separator having a transparent region, said non-conductive separator having a central cavity defined therein so as to space said respective flat faces of said pair of current collectors apart by a predefined distance, wherein the non-conductive separator has a plurality of apertures defined therein so as to be in alignment with said plurality of apertures of each of said pair of current collectors when assembled;
a plurality of gaskets, each gasket forming a hermetic seal between said non-conductive separator and one of said pair of current collectors when assembled;
a seal for said sealable aperture of one of said pair of current collectors; and
a plurality of non-conductive clamps that hold said pair of current collectors, said non-conductive separator and said plurality of gaskets in alignment when assembled.

2. The coin cell of claim 1, wherein said plurality of non-conductive clamps are nuts and screws.

3. The coin cell of claim 2, wherein said screws are fabricated from a non-conductive material.

4. The coin cell of claim 2, wherein said screws are fabricated from a conductive material and screw insulators fabricated from a non-conductive material are provided to electrically separate said screws from at least one of said pair of current collectors.

5. The coin cell of claim 1, further comprising a foil made of an electrically conductive material that is compatible with an electrolyte that is to be inserted into said coin cell, said foil positioned in electrical contact with and covering said flat face of one of said pair of current collectors.

6. The coin cell of claim 5, wherein said electrically conductive material and said electrolyte comprise a metal.

7. The coin cell of claim 6, wherein said metal is lithium.

8. The coin cell of claim 5, further comprising a pressure washer that makes electrical contact between said foil and said one of said pair of current collectors.

9. The coin cell of claim 1, wherein said coin cell has cylindrical symmetry.

* * * * *